June 16, 1936.  A. R. WURTELE  2,044,522
INTERNAL COMBUSTION ENGINE
Filed Aug. 23, 1933  3 Sheets-Sheet 2

INVENTOR.
Allan R. Wurtele
BY
F. Bascom Smith
ATTORNEY.

June 16, 1936.　　　A. R. WURTELE　　　2,044,522

INTERNAL COMBUSTION ENGINE

Filed Aug. 23, 1933　　　3 Sheets-Sheet 3

INVENTOR.
Allan R. Wurtele
BY
F. Bascom Smith
ATTORNEY

Patented June 16, 1936

2,044,522

UNITED STATES PATENT OFFICE 2,044,522

INTERNAL COMBUSTION ENGINE

Allan R. Wurtele, New Roads, La.

Application August 23, 1933, Serial No. 686,345

20 Claims. (Cl. 123—32)

This invention relates to internal combustion engines and more particularly to engines of the solid fuel injection type.

One of the objects of the present invention is to provide novel fuel injecting apparatus for solid fuel injection engines.

Another object of the invention is to provide novel fuel injection control means for varying the fuel charge injected into the power cylinder for each stroke of the power piston.

Still another object is to provide a novel combination of fuel injection pump and power cylinder valve wherein the engine fuel may be employed for actuating or cooling said valve or both.

A further object is to provide novel air-starting apparatus for internal combustion engines, which may also be employed for reversing the engine.

A still further object is to provide a novel control unit for a Diesel type engine which is simple and compact with a small number of parts and by means of which the entire control of the engine is centralized.

Another object is to provide control means for an internal combustion engine wherein a single short cam shaft is employed for actuating exhaust valves, air-starting valves and fuel injection pumps.

Another object is to provide a novel combination of fuel injection pump and valve whereby the valve is internally guided in the plane of its seat and wherein the fuel injection pump may be removed from the valve without removing the valve from the cylinder head.

The above and further objects and novel features of the invention will more fully appear from the following detailed description taken in connection with the accompanying drawings. It is to be expressly understood, however, that the drawings are for the purpose of illustration only and are not designed as a definition of the limits of the invention, reference being primarily had for this purpose to the appended claims.

In the drawings wherein like reference characters refer to like parts throughout the several views.

Figure 1:
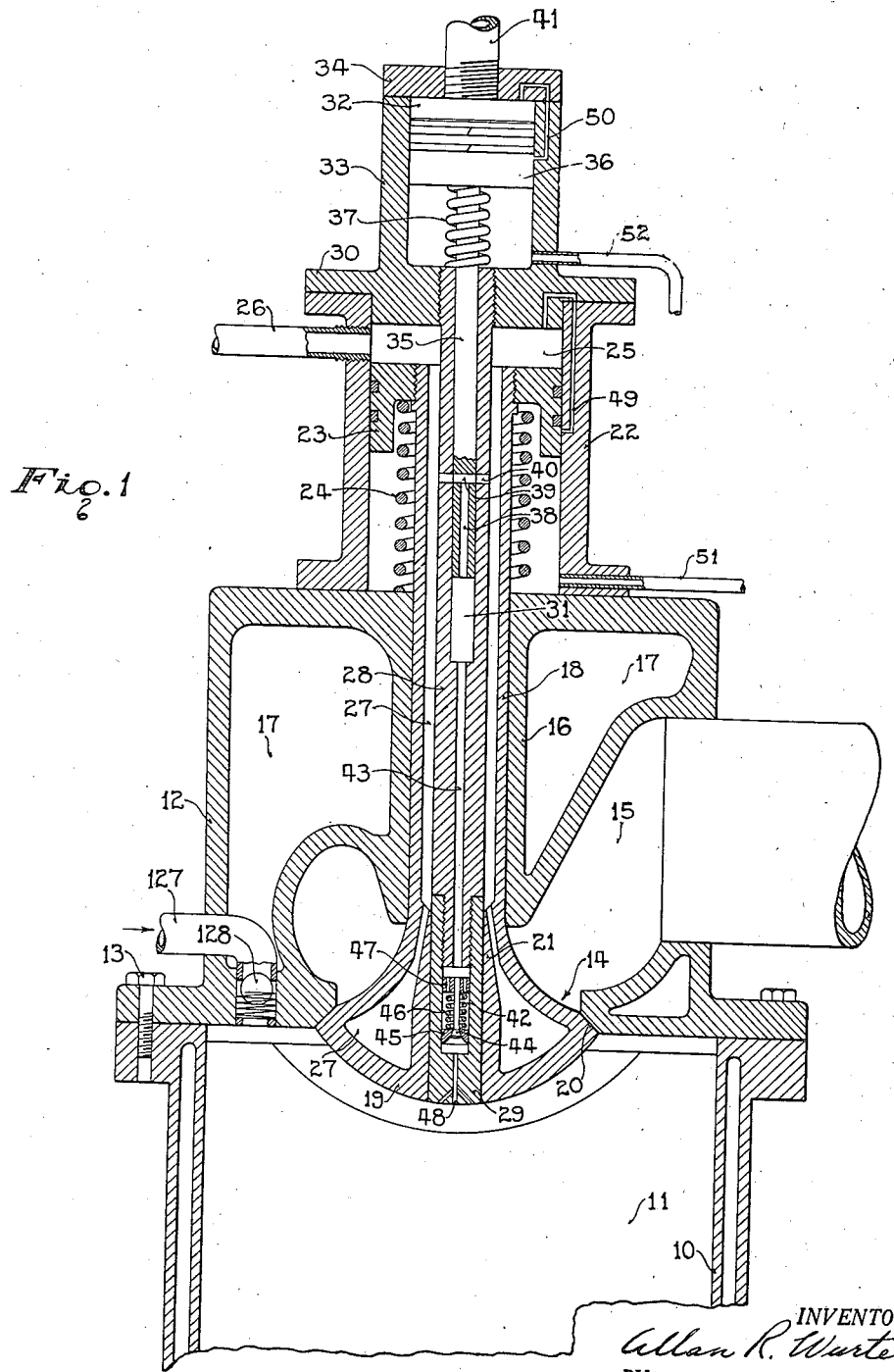
Fig. 1 is an end elevation partly in section and with parts broken away of a portion of an engine showing one form of the novel valve and fuel injection pump employed in carrying out the present invention.

One embodiment of the novel valve and fuel injection pump combination comprehended by the present invention is illustrated, by way of example, operatively associated with a two-cycle, valve-in-head, port scavenging, solid fuel injection engine, only parts of which are shown. As illustrated in Fig. 1 the engine includes a cylinder 10 in which a piston 11 is adapted to reciprocate, the latter being operatively connected by any suitable means such as connecting rods (Fig. 3) to the engine crank shaft (not shown). Scavenging and combustion supporting air is preferably introduced into the lower end of cylinder 10 when piston 11 is near the bottom of its stroke.

A cylinder head 12 is mounted on the upper end of said cylinder and is secured thereto by means of bolts 13. In the form shown head 12 is provided with a centrally disposed exhaust port 14, an exhaust gas passage 15, and a valve guide 16. A suitable cooling medium may be circulated in space 17 of the cylinder head for cooling the valve guide and exhaust gas passages, as well as conducting some heat from the valve stem to be hereinafter described.

Novel hydraulically operated valve and fuel injection means are provided wherein a liquid fuel is employed for actuating and cooling the valve, and is thereafter pumped into the power cylinder centrally of said valve at high pressure by novel pump means mounted in but actuated independently of the valve. Fuel may thus be injected into the power cylinder after the exhaust valve has been completely closed thereby avoiding any waste caused by mixture of the fuel with the exhaust gases and at a time during the compression stroke of the power piston most conducive to complete and efficient burning of the fuel. Furthermore, by mounting the fuel injection pump adjacent the power cylinder any time-lag in the injection of a charge due to the compressibility of fuels and expansion of long pipe lines under heat and pressure is eliminated.

Preferably the exhaust valve is constituted by a hollow stem 18 extending through guide 16 for free angular and sliding movement therein, and a flared hollow head portion 19 adapted to close upwardly against a valve seat 20 surrounding port 14. Valve head 19 is provided with a central opening in the face thereof and an inwardly extending guide 21 concentric with said opening for slidably receiving the lower end of a stationary spindle to be hereinafter described in detail. The upper end of stem 18 extends into a cylindrical housing 22 secured in any suitable manner to the top of cylinder head 12. A piston 23 having a central opening therein corresponding to the outer diameter of stem 18 is threaded on the upper end of the latter and has a fluid-tight sliding fit in housing 22. Valve head 19 is adapted to be held against seat 20 by a spring 24 interposed between cylinder head 12 and the lower face of piston 23.

The space 25 in housing 22 above piston 23 is in communication through a conduit 26 with a hydraulic system to be hereinafter described and with an annular cooling chamber 27 in the valve 18, 19, the inner walls of said chamber within stem 18 being formed by a spindle 28, 29. The latter is shown secured, at its upper end, by means of screw threads in a cover 30 secured to the upper end of housing 22, and depends into guide 21 in valve head 19, thus constituting guide means for valve 18, 19 in a horizontal plane passing through valve seat 20. Preferably engine fuel is employed as the pressure transmitting and cooling medium in the hydraulic valve actuating system and in cooling chamber 27 respectively.

Novel fuel injection pump means are provided in combination with the above described valve whereby a preheated fuel may be injected centrally and under a high pressure into the power cylinder 10 at any desired instant during the stroke of the power piston 11. In the illustrated embodiment such means are constituted by a differential, hydraulically actuated pump, the smaller cylinder 31 of which is bored in the upper end of spindle 28, the larger cylinder 32 being constituted by a housing 33 formed integrally with cover 30 and a cylinder head 34. A differential piston consisting of a reduced portion or plunger 35 and a larger portion 36 is provided in cylinder 31, 32, said piston being held in its upper position by means of a spring 37 in housing 33. It will be noted that spindle 28, 29 and the other parts of the fuel injection pump may be easily withdrawn from valve 18, 19 without removing the valve from cylinder head 12.

The lower end of plunger 35 is provided with a recess 38 and a plurality of radial ports 39 which are adapted to register with radial openings 40 in member 28 when plunger 35 is in its upper position thereby placing cylinder 31 in communication with the valve cooling chamber 27 and permitting the former to be filled with liquid fuel. When pressure is applied to the upper face of piston 36 through a conduit 41 which is connected to a fluid pressure pump to be hereinafter described, plunger 35 is moved downwardly, first carrying ports 39 out of registration with ports 40, and thereafter forces fuel down through spindle 28, 29 into power cylinder 10. It is pointed out that the step up in pressure occasioned by the use of the differential pump permits of the use of a comparatively low pressure in the hydraulic actuating system therefor, while at the same time maintaining a high injection pressure.

In order to prevent the passage of fuel into the power cylinder due to the pressure in chamber 27 when ports 39 and 40 are in registration, a valve is provided in the lower portion 29 of spindle 28, 29. As shown, member 29 is provided with a recess 42 in the upper end thereof, which receives a reduced threaded portion on the lower end of member 28, and communicates with cylinder 31 through a passage 43 in said last-named member. A valve 44 is adapted to seat upwardly against a valve seat on a plug 45 tightly fitted into recess 42, and is held on said seat by means of a spring 46 acting against a perforated flange 47 secured to the stem of valve 44, said spring being adapted to hold said valve on its seat until a predetermined pressure is exerted thereon. A recess formed below valve 44 communicates with the power cylinder 10 through orifices 48.

For the purpose of preventing the hydraulic systems employed for actuating the valve and fuel pump from becoming air-bound, vents 49 and 50 are provided. As shown these vents connect the upper extremities of the fluid chambers 25 and 32 with points in housing 22 and 36 below the rings on pistons 22 and 35 when the latter are in their upper positions. Any air in the system is thereby vented to atmosphere after each stroke of said pistons while any fluid which escapes through the vents is returned to reservoirs (not shown) through drain pipes 51 and 52.

Heretofore, large oil engines have been equipped with control and actuating gear consisting of a large number of parts in the form of mechanical linkages which are necessarily noisy, weighty, and inefficient. These engines require constant care and frequent repair by a skilled mechanic, and overhaul and assembly are rendered difficult because of the numerous parts. Furthermore a cam shaft coextensive with the length of the engine for actuating and timing the engine valves is usually employed, the same being cumbersome and expensive, and the fuel pumping and starting mechanism are inefficient and complicated. The present invention provides novel control apparatus whereby all of the above difficulties and disadvantages are overcome thereby increasing the efficiency of the engine, simplifying the control, reducing wear and operating costs, and eliminating the difficulties of overhaul and repair, as well as facilitating maneuvering and starting.

Figure 2:
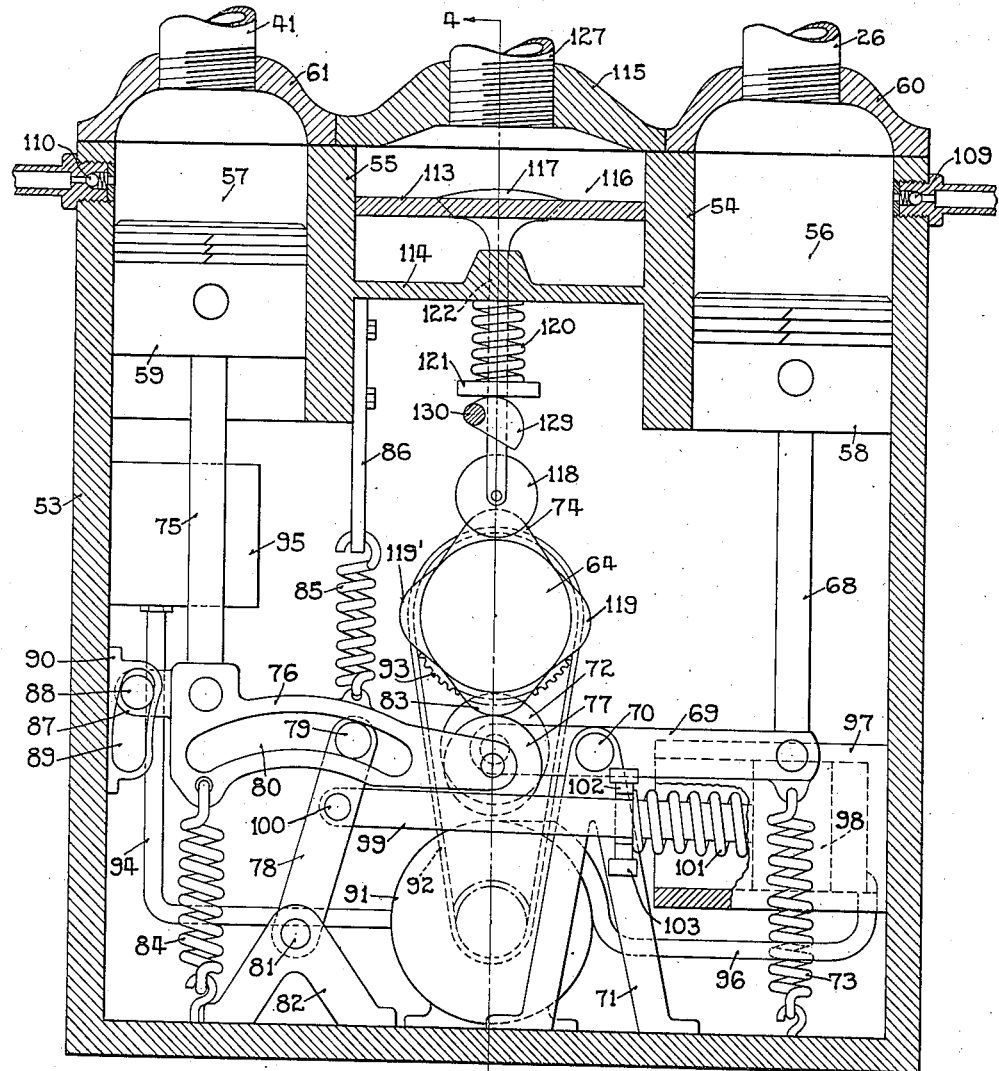
Fig. 2 is an end elevation on an enlarged scale of one form of the novel control apparatus comprehended by this invention, the view being taken on line 2—2 of Fig. 5.
Figure 3:
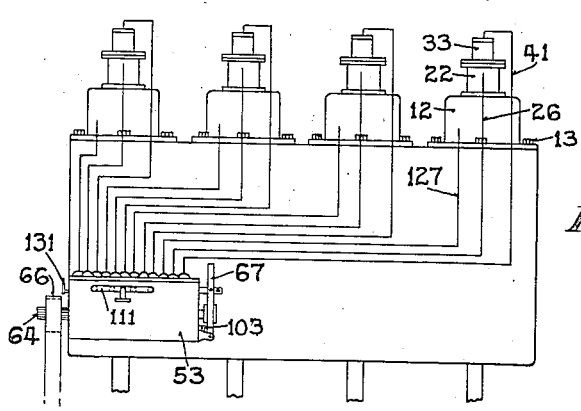
Fig. 3 is a diagrammatic view illustrating the control unit mounted on a four-cylinder engine.

In the illustrated embodiment, which is somewhat diagrammatic, the novel control unit embodies a fuel pump and valve actuating mechanism, as well as air-starting control means which may also be employed in maneuvering for reversing the engine, mounted in a single small housing 53 adapted to be secured in any suitable manner to the frame of an engine (Fig. 3). Two rows of cylinders 56 and 57, having cylinder walls 54 and 55, are provided in the upper portion of housing 53, the number of cylinders in each row being equal to the number of cylinders in the engine with which the control box is to be employed. A four-cylinder engine is illustrated. Cylinders 56 and 57 are provided with pistons 58 and 59 (Fig. 2) and cylinder heads 60 and 61, respectively. The fluid pressure pumps thus constituted have the fluid chambers thereof filled with a suitable pressure transmitting liquid and are connected by means of conduits 26 and 41 respectively, to the fluid chambers 25 and 32 (Fig. 1) for actuating the exhaust valve, and for actuating and supplying a fuel to the fuel injection pumps 31, 35 as pointed out heretofore.

For actuating and timing the operation of pistons 58 and 59 a single short cam shaft 64 is rotatably supported by means of roller bearings 65 (Fig. 4) in the lower central portion of housing 53 and is driven from the engine crankshaft (not shown) through a gear 66. Cam shaft 64 may be splined to permit longitudinal movement of the same for a purpose to appear hereafter by means of a lever 67 operatively engaging one end thereof.

Piston 58 (Fig. 2) of each of the valve actuating pumps is provided with a piston rod 68 pivotally connected at its lower end to one end of a horizontally disposed lever 69 which is in turn pivoted intermediate its ends on a shaft 70 supported by brackets 71. The other end of lever 69 is provided with a roller 72 adapted to be held in engagement with the lower side of cam shaft 64 by means of a spring 73 attached to the bottom of housing 53. Preferably pivot 70 is so positioned that a small movement of roller 72 will result in an increased movement of the pistons 58 thereby permitting the use of small cams 74 while at the same time obtaining a sufficient movement of said pistons to effect the opening of the exhaust valves.

Figure 4:
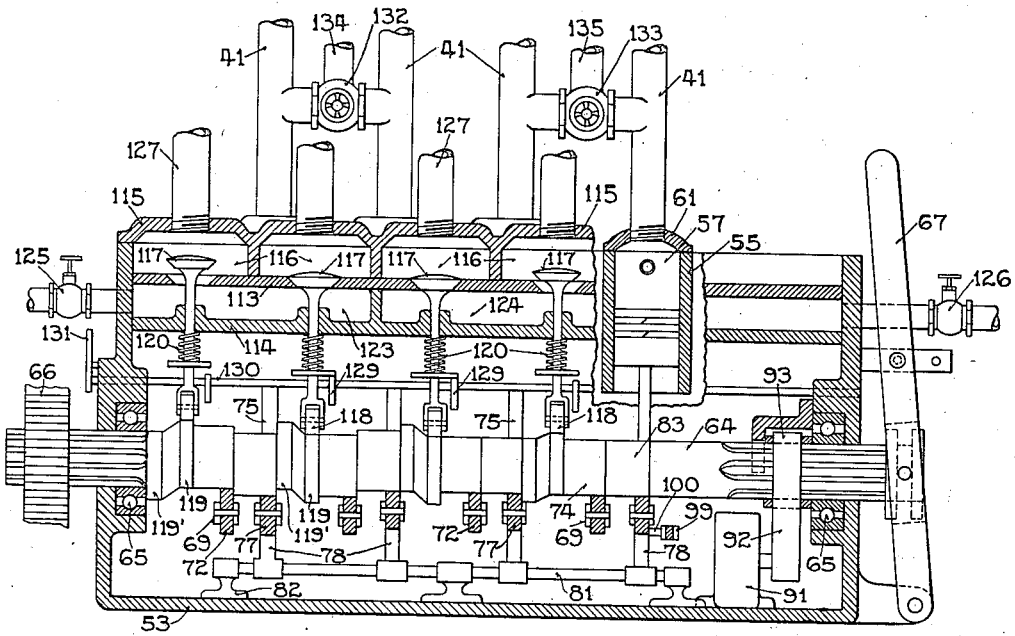
Fig. 4 is a side elevation of the control unit partly in section and with parts broken away, the view being taken on line 4—4 of Fig. 2.

Pumps 57, 59 are, as pointed out above, connected to and adapted to actuate the fuel injection pumps 35, 36. To control the amount of each charge of fuel injected into the engine cylinders, and hence control the engine speed, novel means are provided for varying the stroke of pistons 59 thereby varying the stroke of the fuel injection pump pistons accordingly. As shown, a piston rod 75 on each of the pistons 59 is connected at its lower end to one end of an arm 76 which is provided at its opposite end with a roller 77 in engagement with the lower side of cam shaft 64. Arm 76 is pivoted intermediate its ends on a movable pivot constituted by an arm 78 having a pin 79 at its upper end extending into an arcuate slot 80 in arm 76. The lower end of each of the arms 78 is rigidly secured to a lay shaft 81 which is pivotally supported on brackets 82 attached to the bottom of housing 53 (Fig. 4).

When pivot 79 is moved to the extreme left, as viewed in Fig. 2, the vertical movement of roller 77 effected by cam surface 83 will not be effective to move piston 59 and hence no movement will be transmitted to pistons 35, 36 (Fig. 1) to pump fuel into the power cylinders. As pivot 79 is moved to the right, cam 83 becomes effective through arm 76 to cause piston 59 to reciprocate, the stroke of said piston varying with the position of pivot 79 in slot 80. Roller 77 is held in firm engagement with cam shaft 64 by means of a pair of springs 84 and 85. The relative effectiveness of each of said springs depends on the position of pivot 79 with respect to the center of arm 76, the former spring being attached to said arm in line with piston rod 75 and the latter, suspended from a bracket 86 secured to flange 55, being attached to the upper edge of arm 76 near the center of the latter.

In order to prevent any lateral movement of arm 76, toward which there is a tendency when cam surface 83 engages roller 77, said arm is provided with a projection 87 carrying a pin 88. The latter is constrained to move in an arcuate slot 89 cut in a bracket 90 secured to the side wall of housing 53.

In order to maintain any desired constant engine speed, novel governing means are provided for controlling the position of pivot 79 and hence the size of the fuel charges injected into the engine cylinders. Such means, as shown, are constituted by a centrifugal governing pump 91 having the shaft thereof connected through a chain 92 or other suitable driving means to a gear 93 mounted on cam shaft 64. The intake of said pump is connected by means of a conduit 94 with a liquid storage tank 95 and its pressure side is connected through a pipe 96 to a cylinder 97 secured to the side wall of housing 53. A spring pressed piston 98 is provided in cylinder 97 having a piston rod 99 attached thereto, the outer end of which is operatively connected by means of a pin 100 to one of the arms 78. Movement of the piston 98 will thus be effective to move all of the arms 78 and hence pivots 79 in unison through the medium of shaft 81.

Figure 5:
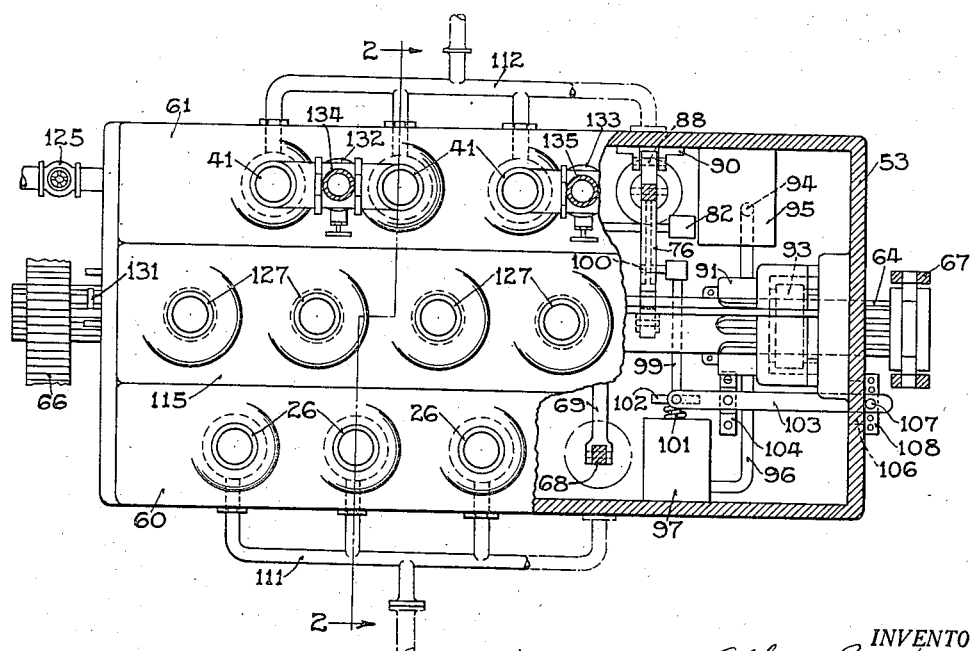
Fig. 5 is a top plan view of the novel control unit with parts broken away.

A spring 101 is interposed between the outer face of piston 98 and a collar 102, the latter preferably surrounding piston rod 99 and being pivotally secured to the inner forked end of a control lever 103. Said lever is pivoted on a bracket 104 (Fig. 5) and extends through an opening 106 in the end of housing 53, the outer end thereof being provided with a handle 107 adapted to engage openings in a bracket 108 for maintaining said lever in adjusted position.

It will now be seen that pressure will be imposed on one side of piston 98 by pump 91, such pressure being proportional to the speed of the engine, and on the other side by spring 101, the piston assumping a position at which the two pressures are equalized thereby determining the fuel charge pumped into the engine cylinders, and hence the speed. The greater the pressure placed on said spring by lever 103, the further piston 98 and pivots 79 will be moved to the right (Fig. 2). The pumping strokes of pump 57, 59 will thus be increased, as pointed out above, thereby increasing the fuel charge pumped into the engine cylinders and increasing the engine speed. If, however, for a given setting of lever 103 there is a tendency for the engine to speed up, the governing pump pressure will be correspondingly increased, moving piston 98 and pivots 79 to the left, reducing the strokes of pistons 59 and the size of the fuel charge so that desired constant speed corresponding to the manual setting of lever 103 will be secured. Whenever there is a tendency for the engine to slow down, the reverse operation takes place, i. e., the governing pump pressure decreases allowing spring 101 to move piston 98 and pivots 79 to the right thereby increasing the fuel charge to maintain the desired speed.

Cylinders 56 and 57 are each provided with a non-return valve, such as ball check valves 109 and 110, through which the cylinders are connected to fluid make up lines 111 and 112 respectively, whereby the various fluid pressure systems are maintained at all times full of liquid. It is pointed out that in such a system no time lag in the injection of fuel nor any variation in the size of the fuel charge is created by the expansion of the various conduits or liquids due to heat. Preferably, a non-compressible liquid having a low coefficient of expansion is used in the fuel pump hydraulic system, i. e., in cylinders 57, whereas in the illustrated embodiment an engine fuel is employed in the exhaust valve operating system, i. e., in cylinders 56, said fuel being introduced into the injection pump 31, 35 and thence to the power cylinder 10 in the manner pointed out in connection with Fig. 1.

Novel means are provided within housing 53 and adapted to be controlled by cam shaft 64, whereby the engine may be started or reversed with ease and rapidity. As shown, such means include a pair of horizontally disposed, vertically spaced plates 113 and 114 secured in any suitable manner, such as by welding, in the elongated opening between cylinder walls 54 and 55, and a cover 115 for said opening. The space formed between cover 115 and plate 113 is divided into four compartments 116 and a valve port is provided in plate 113 for each of said compartments. Valves 117 seat downwardly to close said ports, the stems thereof depending through guides in lower plate 114 and extending downwardly to cam shaft 64, the lower ends of the same being provided with rollers 118 for engaging cam surfaces 119 formed on said cam shaft. Springs 120 are interposed between plate 114 and flanges 121 on valve stems 122 for holding valves 117 on their seats.

The space between plates 113 and 114 is preferably divided into two compartments 123 and 124 (Fig. 4), each of which is connected to a source of supply of compressed air (not shown) through valves 125 and 126, respectively. Upper compartments 116 are each connected to a power cylinder of the engine by means of conduits 127 extending from cover 115 to cylinder head 12 (Fig. 1). A non-return valve of any suitable type such as a ball check valve 128 is provided in each conduit 127 adjacent cylinders 10 to prevent escape of combustible gases and loss of compression during normal operation of the engine. When the engine is operating under its own power, air may be cut off from compartments 123 and 124 by the closure of valves 125 and 126 and to prevent wear of valves 117 and cams 119 the former may then be held in raised position by means of cams 129. The latter are rigidly secured to a shaft 130 extending longitudinally of housing 53 and are adapted to engage the lower faces of flanges 121 when said shaft is rotated by means of a handle 131 (Fig. 4).

Adjacent pairs of conduits 41 are provided with by-pass valves 132 and 133, respectively, connected to a pressure fluid storage tank (not shown) by means of conduits 134 and 135. When said by-pass valves are opened, it will be apparent that the pressure in the fuel pump systems will be relieved and the fuel injection pumps will not be actuated for pumping fuel into the power cylinders.

In order that the engine may be reversed or started in either direction, the portion of the cam shaft 64 having engagement with rollers 118 for actuating valves 117 is provided with a pair of laterally displaced, oppositely disposed cams 119 and 119'. Cam shaft 64 is splined in its bearings and is adapted to be shifted longitudinally, by means of lever 67, a sufficient amount to shift rollers 118 from cams 119 to cams 119' or vice versa, each of said cams being joined by inclined surfaces to facilitate the shifting of the cam shaft. It will be noted that the vertical center lines of pistons 58 and 59 and of valves 117 are staggered in the longitudinal direction of the cam shaft and the cam surface corresponding to each is of sufficient length to accommodate the respective rollers during the shifting of the cam shaft.

In operation, beginning with the parts in the positions shown in the drawings, i. e., with cam shaft 64 moved to the extreme left (Fig. 4), cams 129 in lowered position to permit the actuation of valves 117 by cams 119, and fuel by-pass valves 132 and 133 open, the engine may be started in what may be termed the forward direction in the following manner: valves 125 and 126 are opened to admit compressed air to air boxes 123 and 124, which air is thence conducted through valves 117 and conduits 127 to the engine cylinders 10 corresponding to the valves 117 which are open. The engine crank shaft is thus started to rotate and transmits rotation through gear 66 to shaft 64, the latter thereby becoming effective to actuate air valves 117 and fluid pressure pumps 56, 58 which in turn operate exhaust valves 18, 19 in proper sequence as heretofore pointed out. No fuel is pumped into the cylinders 10, however, while valves 132 and 133 are open, the fluid from the fluid pressure pumps 57, 59 being returned to the source of supply through the by-pass valves.

Shortly after the engine crank shaft is started rotating valves 125 and 132 are closed thus cutting off the air to two of the engine cylinders and permitting a fuel charge, the size of which will depend upon the setting of control lever 103, to be pumped into the same by pumps 31, 35, which latter become operative upon the closure of valve 132 whereby fluid pressure is transmitted from cylinders 57 to cylinders 32. As soon as these two cylinders commence to fire, air is cut off and fuel is admitted to the other two cylinders by closing valves 126 and 133.

During the normal operation of the engine, pistons 58 are actuated by cams 74 on shaft 64 and are effective to transmit pressure through the liquid fuel in the system 56, 26, 25 to operate exhaust valves 18, 19 in the desired sequence and to supply fuel through ports 38 and 40 to cylinder 31 of the fuel injection pumps 31, 35. At the desired time determined by the position of cams 83, the latter pumps are actuated, as pointed out above, to pump fuel into the cylinders 10, the stroke of plunger 35 being proportional to the stroke of pistons 59, which is in turn controlled through lever 103 by positioning pivot 79 in slot 80. By thus controlling the stroke of pistons 35 and hence the size of the fuel charge injected into the cylinders 10 it will be seen that the speed of the engine may be regulated by a proper movement of control lever 103.

If it is desired to reverse the direction of rotation of the engine crank shaft, the same is first brought to rest by opening by-pass valves 132 and 133 thereby stopping the operation of fuel injection pumps 31, 35 and cutting off the supply of fuel to cylinders 10. Cam shaft 64 is then shifted to the right (Fig. 4) by means of lever 67 to place the cam followers 72, 77 and 118 in engagement with the respective reverse cams, the inclined surfaces between the ahead and reverse cams corresponding to each cylinder facilitating the shifting movement of said cam shaft. When valves 125 and 126 are now opened air will be admitted through valves 117 to the engine cylinders which were on exhaust or up stroke when the engine came to rest and hence will be effective to start the pistons therein downwardly thereby reversing the direction of rotation of the crank shaft. Air is now cut out and fuel admitted to the engine cylinders 10 in pairs in the same manner as pointed out above to again establish firing in the cylinders.

It will be noted then that the engine may be started and operated in either direction and reversed with ease and facility. The pairs of valves 125, 132 and 126, 133 may be operated in the reverse order from that used in the above description of the operation and each pair may be mounted for simultaneous actuation by a single control member if desired. When the engine is operating under its own power, the air starting valve cam followers 118 may be moved out of engagement with cam shaft 64 by means of lever 131 and the attached cams 129 to prevent unnecessary wear of said cams and cam followers. It will also be noted that the engine may be stopped by moving pivot 79 to the extreme left (Fig. 2) by means of lever 103 whereby the movement of pistons 59 is discontinued.

There is thus provided novel fuel injection and control apparatus for oil burning internal combustion engines, whereby the engine fuel is injected at high pressure by means of a novel fuel pump and valve combination disposed centrally of the power cylinder and wherein the fuel is additionally employed for cooling and actuating the exhaust valve. A novel control unit is provided wherein means are provided for controlling the speed of the engine by varying the stroke of the fuel injection pumps adjacent the power cylinder. Means for developing pressure in the valve actuating hydraulic system and air-starting and reversing means are adapted to be actuated by a single short cam shaft. The usual large number of small parts in engines of this type are thus eliminated as well as time lag in the fuel injection system, and a quiet, smooth running, efficient engine together with ease and rapidity of control are obtained. Weight, space, and cost of production and maintenace are reduced and the control is centralized and extremely simplified.

Although only one embodiment of the invention is illustrated and described, it is to be expressly understood that the same is not limited thereto, but that various changes may be made in the design and arrangement of parts illustrated as will now be apparent to those skilled in the art. Reference will be primarily had to the appended claims for a definition of the limits of the invention.

What is claimed is:

1. In apparatus of the class described, a cylinder head having a port and a valve guide therein, a valve for said port adapted to be reciprocated in said guide, said valve having an enlarged head portion and a hollow stem, a housing surrounding the upper end of said stem, a piston secured to said stem and engaging the inner walls of said housing, the space in the latter above said piston being in constant communication with the hollow center portion of said stem, means for supplying a liquid to said space, means for subjecting said liquid to pressure for actuating said valve, means tending to hold said valve on its seat, a stationary hollow spindle secured to said housing and extending into a guide in said valve head, a valve in said spindle adapted to open at a predetermined pressure, said spindle having a radial opening connecting the hollow center portions of said stem and spindle, a plunger extending into the upper end of said spindle, and fluid pressure means for actuating said plunger, whereby fluid in said spindle is forced by said last-named valve.

2. In an internal combustion engine wherein hydraulic means are employed for operating a valve having a cooling space therein, and wherein the fluid chamber of said hydraulic means is in communication with said cooling space, the combination with said valve of a stationary spindle coaxial with said valve and extending therethrough, said spindle having a hollow center portion adapted to communicate with said cooling space and a contracted outlet at the base thereof, a valve in said spindle adjacent the lower end thereof, a plunger depending into said spindle, and means for actuating said plunger whereby fluid is pumped through the valve and contracted outlet in said spindle.

3. In an internal combustion engine wherein a hollow valve for the power cylinder is adapted to be hydraulically actuated and wherein the fluid of the hydraulic system is employed as a cooling medium in said valve, the combination with said valve of a fuel pump comprising a differential cylinder, the smaller portion of which extends into said valve and is provided with a radial port for the admission of a fuel, a relief valve in said smaller portion, a differential piston in said cylinder, and means for applying pressure to the large portion of said piston, whereby fuel is pumped through said relief valve into the power cylinder.

4. In an internal combustion engine a power cylinder having a port, a tubular valve for said port having an enlarged head portion, fuel pump means in said valve including a cylinder and a plunger, a normally closed valve in said pump cylinder adapted to open towards said power cylinder, means for introducing a fuel into the pump cylinder through a chamber in said valve surrounding said pump cylinder, and means exterior of said valve for actuating the pump plunger whereby fuel is forced into the power cylinder.

5. In apparatus of the class described, a valve having a hollow stem, a tubular spindle extending coaxially through said valve and forming the inner walls of a cooling chamber in said valve, a relief valve in said spindle, means for introducing a liquid fuel into said spindle through said chamber, a plunger in said spindle, and means for actuating said plunger whereby fuel is pumped through said relief valve into a combustion space.

6. In an internal combustion engine wherein a liquid fuel is injected into the power cylinder coaxially of a valve for said cylinder, a fuel pump comprising a hollow spindle extending through said valve, said spindle having fuel inlet ports intermediate the ends thereof for communication with an annular cooling chamber in said valve, a plunger in said spindle adapted to open and close said ports, and hydraulic means including an enlarged portion on the upper end of said plunger for actuating the latter to pump fuel into said power cylinder.

7. In an internal combustion engine, a power cylinder, fuel injection means comprising a differential cylinder and a differential piston therein, means for supplying fuel to the small end of said differential cylinder, said latter end having a contracted opening therein in communication with said power cylinder, a relief valve interposed between said opening and said piston to prevent the passage of fuel below a predetermined pressure, means for supplying a fluid under pressure to the large end of said cylinder for actuating said piston, and control means responsive to the speed of the engine for varying the quantity of fluid delivered to said last-named end whereby the stroke of said piston is varied.

8. In an internal combustion engine, a power cylinder having a port, a valve for said port having a cooling chamber and a fuel passage therein, means for introducing fuel from said chamber into said passage, and hydraulic means for pumping fuel from said passage into said power cylinder.

9. In an internal combustion engine, a power cylinder having a port, a valve for said port, hydraulic means for actuating said valve, pump means centrally disposed in said valve, the pump cylinder being adapted to communicate with the fluid chamber of said hydraulic means, and means exteriorly of said valve for actuating said pump means to pump some of said fluid into the power cylinder.

10. In an internal combustion engine, a power cylinder having a port, a valve for said port, a stationary hollow spindle extending through said valve and forming a cooling chamber in the latter surrounding said spindle, hydraulic means for actuating said valve, said cooling chamber and the hollow center portion of said spindle being adapted to communicate with the fluid chamber of said hydraulic means, a plunger in said spindle, and means for actuating said plunger to pump fluid through a reduced opening in the end of said spindle into the power cylinder.

11. A control unit for an internal combustion engine, comprising a cam shaft adapted to be driven by said engine, a plurality of closely associated fluid pressure pumps adapted to be actuated by the cams on said shaft, said pumps constituting means for actuating fuel pumps remote from said unit for forcing a fuel into the engine cylinders, governing means driven in accordance with the speed of said engine for varying the strokes of said fluid pressure pumps, and means for controlling said governing means.

12. In an internal combustion engine wherein a solid fuel is injected into the power cylinder, and wherein a fuel injection pump is provided adjacent each cylinder, the combination therewith of a control unit comprising a plurality of fluid pressure pumps for actuating said fuel injection pumps, means driven from the engine crank shaft for actuating said fluid pressure pumps, governing means for controlling the plunger stroke of said last-named pumps, and means for controlling said governing means to change the speed of the engine.

13. In an internal combustion engine wherein solid fuel is injected into the power cylinder by means of a fuel pump adjacent each cylinder and wherein a valve for each cylinder is hydraulically actuated, the combination therewith of a control unit comprising a set of fluid pressure pumps for actuating said valves, a second set of fluid pressure pumps for actuating said fuel injection pumps, a shaft having cams thereon for actuating said fluid pressure pumps, means for drivably connecting said shaft to the engine crank shaft, and means for varying the pumping strokes of said second set of pumps to vary the speed of the engine.

14. In an internal combustion engine, a power cylinder having a port, a valve for said port, fuel pumping means in said valve, means including a conduit for introducing compressed air into said cylinder, an air valve adjacent one end of said conduit, fluid pressure pumps for actuating said first-named valve and said fuel pumping means, and control mechanism including a single cam shaft for actuating said pressure pumps and air valve in a predetermined manner.

15. In an internal combustion engine, wherein a solid fuel is injected into the power cylinders and wherein a fuel injection pump is provided adjacent each of said cylinders, the combination therewith of a control unit comprising a plurality of fluid pressure pumps for actuating said fuel injection pumps, means operatively connected to the engine crankshaft for actuating said fluid pressure pumps, and means including cam actuated arms and movable pivots therefor for varying the strokes of the pistons in said last-named pumps for controlling the size of each fuel charge injected into the power cylinders.

16. In an internal combustion engine, a power cylinder having a port, a valve for said port having an enlarged head portion and a hollow stem having a cooling space therein, fuel pumping means in said valve adapted to communicate with said power cylinder and adapted to be removed from said valve without removing the latter from the cylinder head, and means exteriorly of said valve for actuating said pump means.

17. In an internal combustion engine, a power cylinder having a port, a valve for said port having a hollow stem and an enlarged head portion, a valve seat surrounding said port, a stationary spindle depending into said head portion for guiding said valve, a portion of said spindle being in the plane of said seat and the hollow center portion thereof being adapted to communicate with said cylinder, a plunger in said spindle, means for introducing a fuel into the latter below said plunger, and means for actuating said plunger to force fuel into said cylinder.

18. In an internal combustion engine having a power cylinder having a port, a power piston in said cylinder, a valve for said port, and a fuel pump adjacent said cylinder, the combination therewith of a control unit comprising fluid pressure means for actuating said valve, fluid pressure means for actuating said fuel pump, and a single cam shaft operatively connected to the engine crankshaft for controlling both of said fluid pressure means.

19. In an internal combustion engine having a power cylinder, a fuel injection pump for said cylinder, and a mechanically actuated fluid pressure pump for actuating said injection pump, the combination therewith of means for controlling the pumping stroke of said fluid pressure pump to vary the fuel charge pumped into said cylinder, including a cam actuated arm and a movable pivot for said arm.

20. In an internal combustion engine having a power cylinder, a fuel injection pump for said cylinder, and a cam actuated fluid pressure pump for actuating said injection pump, the combination therewith of means for controlling the effective pumping stroke of said fluid pressure pump to vary the fuel charge pumped into said cylinder, said last named means including a cam actuated arm, a pivot for said arm movable relative thereto, and governing means for controlling the movement of said pivot for maintaining a predetermined engine speed.

ALLAN R. WURTELE.